United States Patent
Taguchi

(10) Patent No.: US 10,007,697 B2
(45) Date of Patent: Jun. 26, 2018

(54) LOCATION SEARCH DEVICE

(71) Applicant: DENSO CORPORATION, Kariya, Aichi-pref. (JP)

(72) Inventor: Erika Taguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 449 days.

(21) Appl. No.: 14/765,973

(22) PCT Filed: Feb. 4, 2014

(86) PCT No.: PCT/JP2014/000562
§ 371 (c)(1),
(2) Date: Aug. 5, 2015

(87) PCT Pub. No.: WO2014/122916
PCT Pub. Date: Aug. 14, 2014

(65) Prior Publication Data
US 2015/0370851 A1 Dec. 24, 2015

(30) Foreign Application Priority Data
Feb. 7, 2013 (JP) .................................. 2013-022605

(51) Int. Cl.
G06F 17/30 (2006.01)
(52) U.S. Cl.
CPC ........ G06F 17/30395 (2013.01); G06F 17/30 (2013.01); G06F 17/30241 (2013.01);
(Continued)
(58) Field of Classification Search
CPC ......... G06F 17/30864; G06F 17/30938; G06F 17/30967
(Continued)

(56) References Cited

U.S. PATENT DOCUMENTS 8,407,228 B1 * 3/2013 Hahn ................ G06F 17/30589
707/745
2003/0101171 A1 * 5/2003 Miyamoto ........ G06F 17/30625
(Continued)

FOREIGN PATENT DOCUMENTS

JP     2001-280979 A    10/2001
JP     2004-184563 A     7/2004
(Continued)

OTHER PUBLICATIONS

International Search Report and Written Opinion of the International Searching Authority dated Mar. 11, 2014 issued in the corresponding International application No. PCT/JP2014/000562 (and English translation).

(Continued)

Primary Examiner — Jeffrey A Burke
Assistant Examiner — Thong Vu
(74) Attorney, Agent, or Firm — Posz Law Group, PLC

(57) ABSTRACT

A location search device is provided. The location search device includes a storage in which character string information indicative of a location is divided into three or more search hierarchical levels according to units of division of the search hierarchical levels. The location search device searches for a location by references the character string information in a predefined search sequence of search hierarchical levels to sequentially identify a division on each search hierarchical level based on a character string input from a user. When the location search device accepts a user input designating a search hierarchical level that is reached by moving backward the predefined search sequence of the search hierarchical levels, the location search device regresses to the designated search hierarchical level and re-identify a division.

12 Claims, 8 Drawing Sheets

(52) U.S. Cl.
CPC .. *G06F 17/30528* (2013.01); *G06F 17/30637* (2013.01); *G06F 17/30861* (2013.01)

(58) Field of Classification Search
USPC .......................... 707/775, 764, 634; 382/104
See application file for complete search history.

(56) References Cited

U.S. PATENT DOCUMENTS

| | | |
|---|---|---|
| 2004/0164877 A1 | 8/2004 | Chiba |
| 2006/0265690 A1* | 11/2006 | Motoyama ................ G06F 8/10 717/117 |
| 2007/0127776 A1* | 6/2007 | Tokunaga ............... G01C 21/00 382/104 |
| 2008/0133123 A1 | 6/2008 | Katoh |
| 2008/0154928 A1* | 6/2008 | Bashyam ................ H03M 7/30 |
| 2009/0030599 A1 | 1/2009 | Kawauchi |
| 2009/0265384 A1* | 10/2009 | Xu .................... G06F 17/30017 |
| 2011/0060763 A1 | 3/2011 | Okada et al. |
| 2011/0313973 A1* | 12/2011 | Srivas ............... G06F 17/30194 707/634 |
| 2013/0169787 A1* | 7/2013 | Takeshima ......... G06K 9/00147 348/79 |

FOREIGN PATENT DOCUMENTS

| | | |
|---|---|---|
| JP | 2005-010017 A | 1/2005 |
| JP | 2009-092609 A | 4/2009 |

OTHER PUBLICATIONS

Shin Kato et al., "Kanji Address Input Based on On-line Character Recognision", 49th (latter half of 1994) National Convention of Information Processing Society of Japan, Sep. 20, 1994, pp. 2-199 to 2-200.

* cited by examiner

FIG. 7A

```
House#:      St.
City:        State:XXX
```
```
City
   [ Enter City Name ]
```

FIG. 7B

```
House#:      St.
City:        State:XXX
```
```
City
   [ YYY| ]
```

FIG. 7C

```
House#:      St.
City:YYY     State:XXX
```
```
House#
   [ Enter House Number ]
```

FIG. 8A

House#:12345 St.
City:YYY    State:XXX

Street
　　Enter Street Name

FIG. 8B

House#:12345 St.
City         State:XXX

City
　　Enter City Name

FIG. 8C

House#:12345 St.
City:         State:XXX

City
　　ZZZ

FIG. 8D

House#:12345 St.
City:ZZZ    State:XXX

Street
　　Enter Street Name

LOCATION SEARCH DEVICE

CROSS-REFERENCE TO RELATED APPLICATIONS

This application is a U.S. national stage International Application No. PCT/JP2014/000562 filed on Feb. 4, 2014 and is based on Japanese Patent Application No. 2013-22605 filed on Feb. 7, 2013, the disclosures of which are incorporated herein by reference.

TECHNICAL FIELD

The present disclosure relates to a location search device that searches for a location in accordance with a user-input character string.

BACKGROUND ART

A conventionally known location search device searches an address database for a target location by using an input search address character string as a search key. Further, a well-known technology adopted to perform a search for a desired location uses a plurality of search hierarchical levels, which are classified according to the size of a unit indicative of a division, and narrows the search to find the desired location while identifying divisions in a predefined search sequence of search hierarchical levels.

A technology disclosed, for instance, in Patent Literature 1 performs a search for a desired location by gradually narrowing the search to find the desired location while identifying divisions in a search sequence of search hierarchical levels from a search hierarchical level for a unit indicative of a large division to a search hierarchical level for a unit indicative of a small division, such as in the order of todoufuken (prefecture), shikuchoson (city), oaza/machi (town), chome (block), banchi (street number), goh (house number).

CITATION LIST

Patent Literature

Patent Literature 1: JP 2007-148559A

SUMMARY OF INVENTION

However, in the technology for narrowing the search to find the desired location while identifying divisions in a predefined search sequence of search hierarchical levels, if a user would like to re-identify a division on an intermediate search hierarchical level other than the first search hierarchical level, the user has to regress to the first search hierarchical level and repeat a division identification procedure from the beginning. Therefore, when the user attempts to regress to an intermediate search hierarchical level of the search sequence to re-identify a division, it takes an undue amount of time to search for the desired location.

The present disclosure has been made in view of the foregoing. An object of the present disclosure is to provide a location search device that can save time and effort on a search for a location when a user narrows the search in a predefined sequence of search hierarchical levels and attempts to regress to an intermediate search hierarchical level of a search sequence to re-identify a division.

According to an aspect of the present disclosure, there is provided a location search device comprising a character string information storage section, a character string input section, a division identification section, a location search section, a search hierarchical level designation input section, and a correction section. The character string information storage section divides character string information indicative of a location into three or more search hierarchical levels according to units of division of the search hierarchical levels, and stores the divided character string information. The character string input section accepts a character string input from a user for making a search for the location. In an predefined search sequence of the search hierarchical levels, the division identification section references the character string information of the search hierarchical level stored in the character string information storage section to sequentially identify, for each search hierarchical level, the division indicated by the character string information containing the character string input accepted by the character string input section. The location search section searches for the location through causing the division identification section to sequentially identify the divisions. The search hierarchical level designation input section accepts a user input designating a search hierarchical level. When the search hierarchical level designation input section accepts the input designating a search hierarchical level that is reached by moving backward the predefined search sequence of the search hierarchical levels, the correction section regresses to the designated search hierarchical level and causes the division identification section to re-identify a division.

According to the location search device described above, if the search hierarchical level designation input section accepts a user input designating a search hierarchical level that is reached by moving backward the predefined search sequence of the search hierarchical levels, the correction section can regress to the designated intermediate search hierarchical level to re-identify a division. This eliminates the necessity of repeating a whole division identification procedure by regressing to the beginning of the search sequence. As a result, it is possible to save time and effort on a search for a location when a user narrows the search in a predefined sequence of search hierarchical levels and attempts to regress to an intermediate search hierarchical level of a search sequence to re-identify a division.

BRIEF DESCRIPTION OF DRAWINGS

The above and other objects, features, and advantages of the present disclosure will become more apparent from the following detailed description given with reference to the accompanying drawings, in which:

FIG. 7A is a schematic diagram illustrating an example of the multi-criteria screen and an example of the address input screen that are displayed before a "City Name" is input in a situation where divisions are identified in a search sequence of search hierarchical levels;

FIG. 7B is a schematic diagram illustrating an example of the multi-criteria screen and an example of the address input screen that are displayed before a "City Name" is input in a situation where divisions are identified in a search sequence of search hierarchical levels;

FIG. 7C is a schematic diagram illustrating an example of the multi-criteria screen and an example of the address input screen that are displayed before a "House Number" is input in a situation where divisions are identified in a search sequence for search hierarchical levels;

FIG. 8A is a schematic diagram illustrating an example of the multi-criteria screen and an example of the address input screen that are displayed before a "Street Name" is input in a situation where an address search is performed by regressing in a search sequence of search hierarchical levels;

FIG. 8B is a schematic diagram illustrating an example of the multi-criteria screen and an example of the address input screen that are displayed before a "City Name" is input in a situation where an address search is performed by regressing in a search sequence of search hierarchical levels;

FIG. 8C is a schematic diagram illustrating an example of the multi-criteria screen and an example of the address input screen that are displayed before a "City Name" is input in a situation where an address search is performed by regressing in a search sequence of search hierarchical levels;

FIG. 8D is a schematic diagram illustrating an example of the multi-criteria screen and an example of the address input screen that are displayed before a "Street Name" is input in a situation where an address search is performed by regressing in a search sequence of search hierarchical levels.

DESCRIPTION OF EMBODIMENTS

Figure 1:
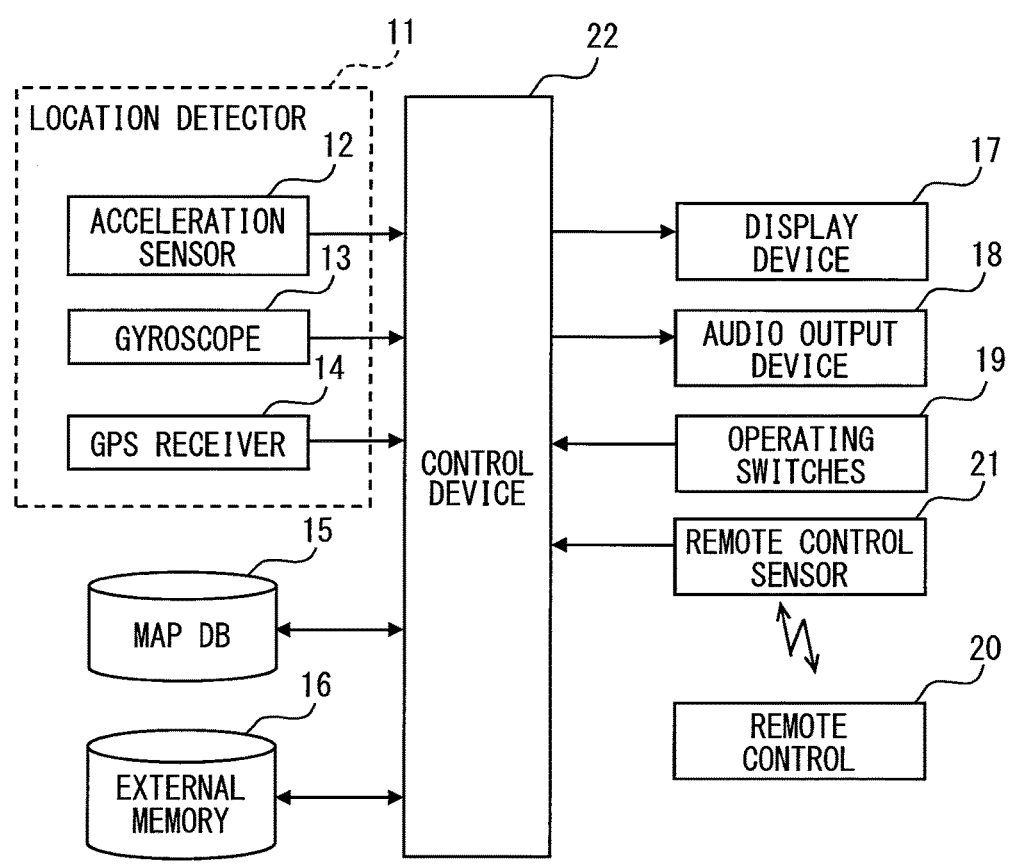
FIG. 1 is a schematic diagram illustrating an exemplary configuration of a navigation device.

Embodiments of the present disclosure will now be described with reference to the accompanying drawings.
First Embodiment FIG. 1 is a schematic diagram illustrating an exemplary configuration of a navigation device 1 according to a first embodiment of the present disclosure. The navigation device 1 may be mounted in a vehicle or a mobile terminal that can be brought into a vehicle. However, the following description is given on the assumption that the navigation device 1 is mounted in a vehicle. The navigation device 1 corresponds to a location search device.

A schematic configuration of the navigation device 1 will now be described. As shown in FIG. 1, the navigation device 1 includes a location detector 11, a map database (DB) 15, an external memory 16, a display device 17, an audio output device 18, operating switches 19, a remote control terminal (hereinafter referred to as the remote control) 20, a remote control sensor 21, and a control device 22.

The location detector 11 includes well-known components, namely, an acceleration sensor 12, a gyroscope 13, and a GPS receiver 14. The GPS receiver 14, which is for a global positioning system (GPS) that detects the location of a host device in accordance with radio waves from a satellite, successively detects the current location of a user of the host device (hereinafter referred to as the user location). It is assumed, for example, that the user location is represented by coordinates that are expressed in terms of latitude and longitude.

The sensors such as the acceleration sensor 12, the gyroscope 13, and the GPS receiver 14 have a sensor-specific error. Therefore, they are configured so as to compensate for their errors. Depending on the accuracy of each sensor, the location detector 11 may be provided with some of the above-mentioned sensors.

The map DB 15 stores, for example, map data, institution data, map matching data, audible route guidance data, location search data, and genre-specific data. The location search data is used as described later to search for a location on a map by using, for example, an address. The genre-specific data makes it possible to search for a destination on an individual genre basis.

The map data, which is used to display a map on the later-described display device 17, includes link data which represents roads, and node data. A link is used to join nodes when each road on a map is divided by a plurality of nodes, which represent, for example, points at which roads intersect, branch, or converge. A road is represented by connecting individual links.

The link data includes various data such as a unique number (link ID) identifying a link, a link length indicating the length of the link, the coordinates (latitude and longitude) of a beginning node and ending node of the link, the name of a road, the type of the road, the width of the road, the number of lanes, the presence of a right- or left-turn-only lane, the number of right- or left-turn-only lanes, and a speed limit.

The node data includes various data such as a node ID that is a unique number assigned to a node on a map, the coordinates of the node, the name of the node, a connection link ID that is a link ID of a link connected to the node, and the type of an intersection.

The institution data includes, for example, polygon data about institutions such as roads, railroads, buildings, and private properties, background data used to draw seas, rivers, and other topographical features, and positional information about various institutions existing on a map.

The location search data is used to search for the locations of a departure point, a transit point, and a destination when they are designated, for instance, by an input address, building name, institution name, intersection name, or phone number. The location search data is configured as map index data in which, for example, an address, a building name, an institution name, an intersection name, or a phone number is associated with coordinates on a map.

Data about addresses (hereinafter referred to as address data), which is included in the location search data, is stored in such a manner that identification information used to identify an institution (hereinafter referred to as an institution ID) is associated with an address that is managed for each hierarchical level (hereinafter referred to as a search hierarchical level) dependent on the magnitude of a unit indicative of a division. Search hierarchy is classified into four hierarchical levels for management purposes. The four hierarchical levels are a state, a city, a street (St.), and a house number (house #). From the largest to the smallest, the units indicative of a division are "state", "city", "street", and "house number".

Here, it is assumed that four different search hierarchical levels, namely, "state", "city", "street", and "house number", are defined. However, the present disclosure is not limited to the use of such four different search hierarchical levels. For example, "todoufuken (prefecture)", "shikuchoson (city)", "oaza/machi (town)", "chome (block)", "banchi (street number)", and "goh (house number)" may be used as the search hierarchical levels instead of "state", "city", "street", and "house number".

Data for the map DB 15 may be acquired, for instance, by causing the control device 22 to download it from a center through a communication device (not shown). Alternatively, such data may be stored in advance in the map DB 15. As the map DB 15, for example, a CD-ROM, a DVD-ROM, a memory card, a hard disk drive, or other storage medium may be used. The map DB 15 corresponds to a character string information storage section.

The external memory 16 is a hard disk drive or other writable large-capacity storage device. The external memory 16 is used, for instance, to store a large amount of data, store data that should not be erased upon power off, and copy frequently-used data from the map DB 15 for use. The external memory 16 may be a removable memory having a relatively small storage capacity.

The display device 17 is used to display, for example, an electronic map, characters, and symbols. The display device 17 includes, for instance, of a liquid-crystal display capable of displaying color images. As the display device 17, a plasma display, an organic EL display, or other display may be used instead of a liquid-crystal display. The audio output device 18 includes, for instance, of a loudspeaker and used to output, for example, a guidance message in accordance with instructions from the control device 22.

The operating switches 19 include, for example, a touch panel provided integrally on the display device 17 and mechanical switches disposed on the periphery of the display device 17. The touch panel to be used may be of a pressure-sensitive type, an electromagnetic induction type, a capacitance type, or a combination of these types. When manipulated, the operating switches 19 issue operating instructions to the control device 22 in order to perform various functions.

Figure 2:
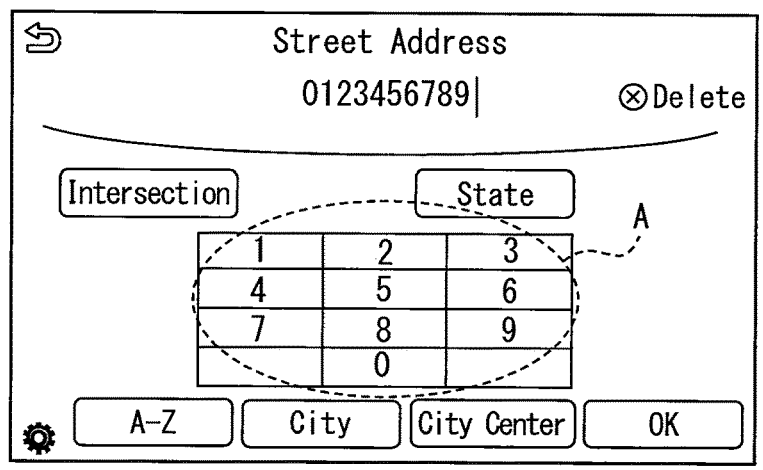
FIG. 2 is a diagram illustrating an example of an address input screen.

FIG. 2 is a diagram illustrating a screen of the display device 17 that is used when the user inputs a destination address (this screen is hereinafter referred to as the address input screen). More specifically, FIG. 2 shows the address input screen that is used to input a street portion of an address (this screen is hereinafter referred to as the street screen). The user can press buttons (see A in FIG. 2) on the address input screen of the touch panel to input a search address character string or apply an input character string. The buttons are marked with alphanumeric characters such as alphabetical characters and numerals. The alphanumeric characters correspond to a character string. The address input screen corresponds to a character input screen. The operating switches 19 correspond to a character string input section.

The remote control 20 includes a plurality of operating switches (not shown). When manipulated, these operating switches input various command signals to the control device 22 through the remote control sensor 21. This causes the control device 22 to perform the same functions as the operating switches 19.

Figure 3:
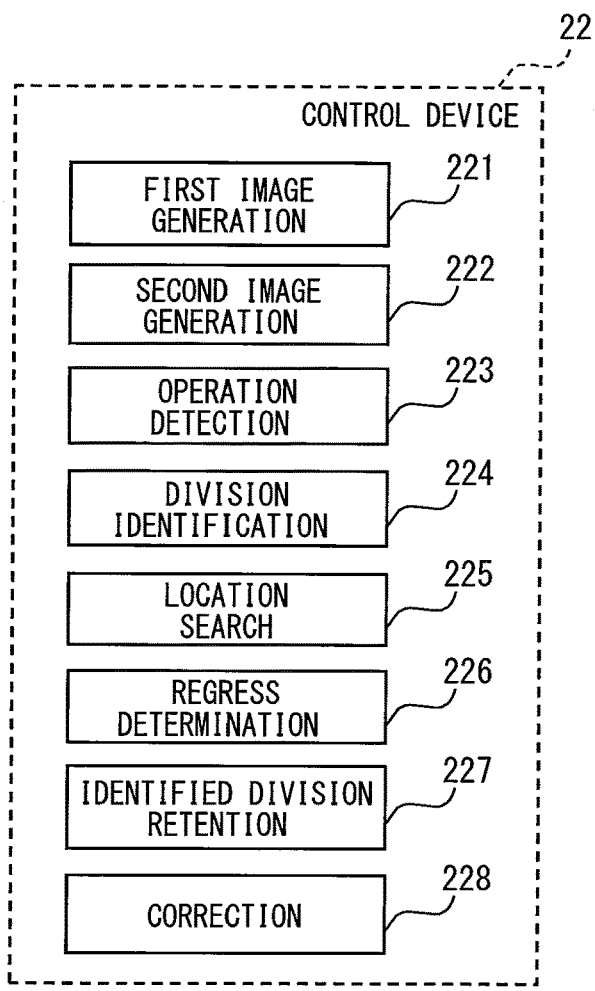
FIG. 3 is a schematic functional block diagram illustrating an exemplary configuration of a control device.

The control device 22 includes a microcomputer as a main component and includes, for example, a CPU, a ROM, a RAM, and a backup RAM. As shown in FIG. 3, the control device 22 includes various functional blocks, namely, a first image generation section 221, a second image generation section 222, an operation detection section 223, a division identification section 224, a location search section 225, a regress determination section 226, an identified division retention section 227, and a correction section 228.

In accordance with various information input from the location detector 11, the map DB 15, the external memory 16, the operating switches 19, and the remote control sensor 21, the control device 22 performs various processes such as an address search process, a route search process, and a route guidance process.

The control device 22 performs the address search process to search for a location desired by the user by referencing address data in accordance with a search address character string input by the user. The address search process will be described in detail later.

Further, when a destination is set, for instance, by the address search process, the control device 22 performs the route search process to search for a route between a selected destination and a departure point such as a current user location. In the route search process, a well-known search method is used to search for a recommended route that satisfies distance priority, time priority, or other predefined conditions.

Moreover, the control device 22 performs the route guidance process to provide guidance along the recommended route retrieved from the route search process. The route guidance process is performed to provide guidance along the recommended route by not only causing the display device 17 to successively display an electronic map indicative of the recommended route and the user location, but also causing the audio output device 18 to successively output an audible guidance message for directing the user to a destination.

Besides, the control device 22 causes the display device 17 to display both a screen generated by the first image generation section 221 and a screen generated by the second image generation section 222. If, for example, two units of the display device 17 are available, they may be configured to permit one unit of the display device 17 to display the screen generated by the first image generation section 221 and the other unit of the display device 17 to display the screen generated by the second image generation section 222. If only one unit of the display device 17 is available, its screen may be divided into two display areas to let one display area display the screen generated by the first image generation section 221 and the other display area display the screen generated by the second image generation section 222.

The following describes an example in which the screen generated by the first image generation section 221 and the screen generated by the second image generation section 222 are arranged one above the other. The screen generated by the first image generation section 221 is referred to as the upper screen, and the screen generated by the second image generation section 222 is referred to as the lower screen.

Figure 4:
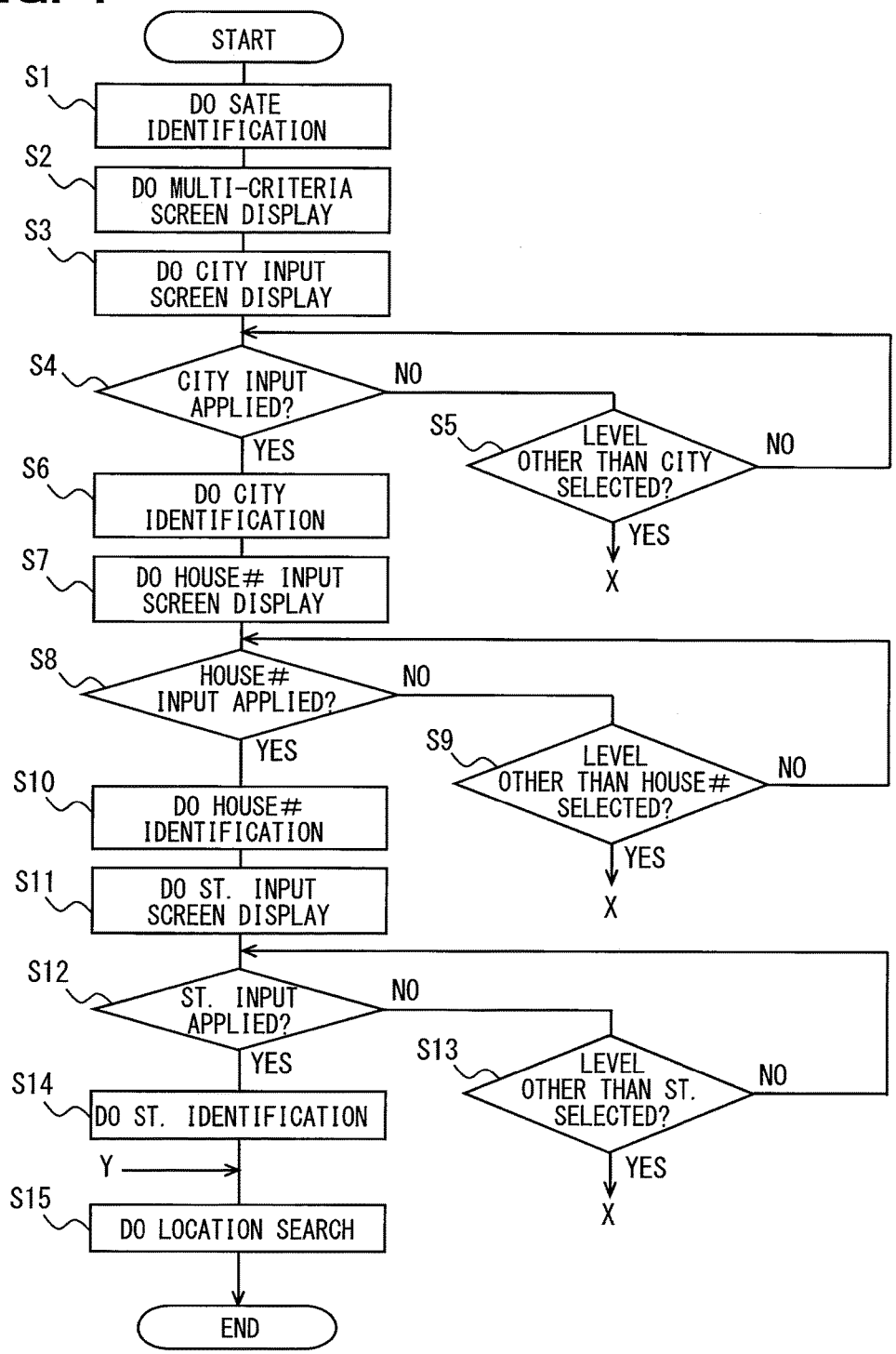
FIG. 4 is a flowchart illustrating an example of an address search process performed by the control device of the navigation device.

The address search process performed by the control device 22 of the navigation device 1 will now be described with reference to the flowcharts of FIGS. 4 and 5. The flowchart of FIG. 4 starts when an address search method is selected from a plurality of different search methods in a situation where the navigation device 1 is in a destination setup mode. In addition to the address search method, for example, an intersection search method, a name search method, and a genre-specific search method are selectable as a search method. It is assumed that the user manipulates the operating switches 19 or the remote control 20 in order to select a search method.

Further, it is assumed that, in the address search process, the control device 22 by default narrows a search to find a location while searching for and identifying divisions in a predefined sequence of searches in search hierarchical levels (also referred to hereinafter as a search sequence). The subsequent description is given on the assumption that the search hierarchical levels are searched in the order of "state", "city", "house number", "street".

First of all, in step S1, the division identification section 224 performs a state identification process. Upon completion of step S1, processing proceeds to step S2. In the state identification process, a state to which the user location detected by the location detector 11 belongs is searched from the hierarchical level "state", and the state retrieved from the search is identified as the state to which a search target location belongs.

In step S2, the first image generation section 221 performs a multi-criteria screen display process. Upon completion of step S2, processing proceeds to step S3. In the multi-criteria screen display process, an image showing a later-described multi-criteria operating screen is superimposed over an image showing a normal screen, and an upper screen obtained by superimposing the operating screen (hereinafter referred to as the multi-criteria screen) over the normal screen is displayed. The normal screen is, for example, a map screen of a common navigation device. The first image generation section 221 corresponds to a multi-criteria screen display control section.

In the first embodiment, the term "multi-criteria" denotes a function of jumping to an operation for identifying a division on a search hierarchical level that is not quickly accessible in the aforementioned search sequence of the search hierarchical levels. The multi-criteria screen is an operating screen that is displayed on the touch panel to accept such an operation. In other words, the multi-criteria screen is an operating screen that permits the user to freely select a desired search hierarchical level from all the search hierarchical levels.

Figure 6:
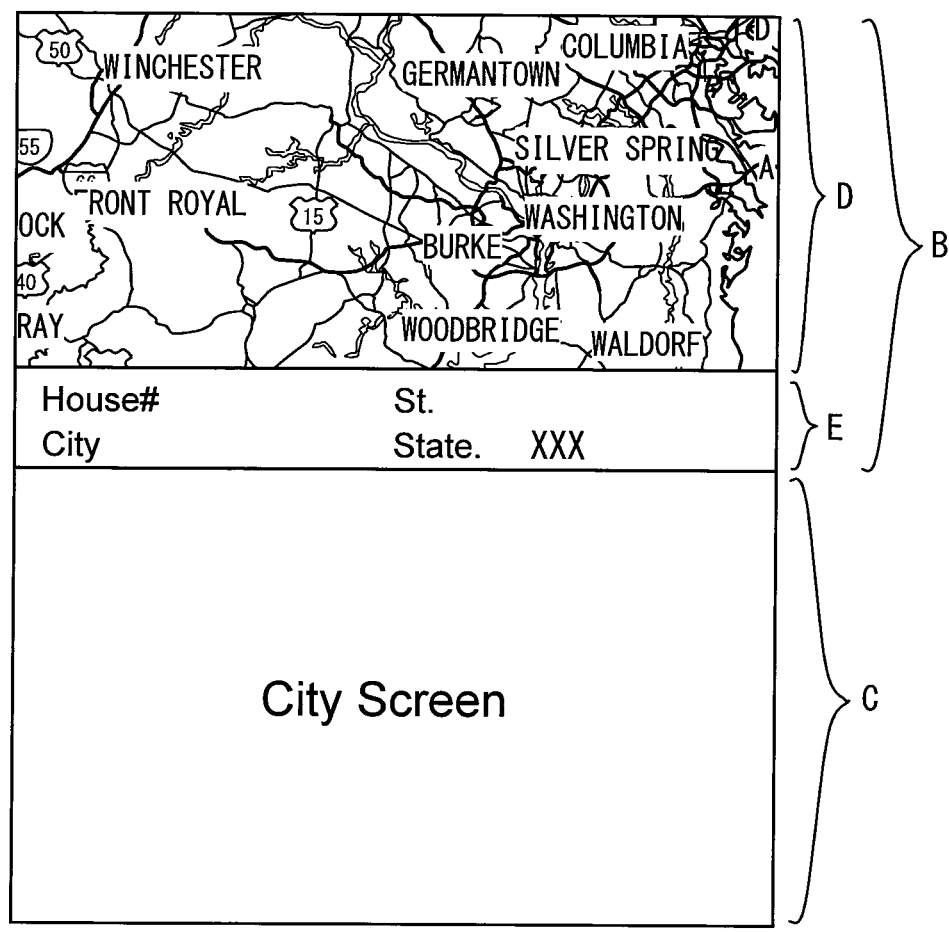
FIG. 6 is a diagram illustrating a multi-criteria screen.

The multi-criteria screen will now be described with reference to FIG. 6. In FIG. 6, B denotes an upper screen, C denotes a lower screen, D denotes a normal screen, and E denotes a multi-criteria screen. As shown in FIG. 6, the multi-criteria screen displays input items required to select each search hierarchical level, namely, "state", "city", "house number", and "street". The user can select an input item by touching a touch panel area corresponding to the input item. The operating switches 19 correspond to a search hierarchical level designation input section.

Further, it is assumed that an input item field corresponding to a search hierarchical level for which a division is identified shows the name of the identified division. If, for instance, the state is identified as "XXX", the input item field corresponding to the hierarchical level "state" shows "XXX".

The first image generation section 221 causes the display device 17 to display an image that is obtained by superimposing the multi-criteria screen over a normal screen as described earlier. Consequently, the multi-criteria screen is displayed in preference to the normal screen. Meanwhile, it is preferred that the first image generation section 221 display a warning pop-up or other warning screen in preference to the multi-criteria screen. The warning screen may be displayed in preference to the multi-criteria screen, for example, by displaying the warning screen over the multi-criteria screen or by displaying the warning screen in place of the multi-criteria screen.

Displaying high-priority information (for example, emergency information such as information about a disaster or an accident) over or in place of the multi-criteria screen as described above provides increased user-friendliness and safety.

In step S3, the second image generation section 222 performs a city input screen display process. Upon completion of step S3, processing proceeds to step S4. As shown in FIG. 6, in the city input screen display process, the display device 17 displays an address input screen for inputting a city (hereinafter referred to as the city screen), which is a part of an address, as the earlier-described lower screen (see C in FIG. 6). The city screen can be used in the same manner as the earlier-described street screen. More specifically, the user can input a search address character string and apply the input character string by pressing, with a finger or the like, a button on the address input screen displayed on the touch panel. The second image generation section 222 corresponds to a character string input screen display control section.

Step S2 may be performed earlier than or later than step S3. Alternatively, steps S2 and S3 may be performed simultaneously. Further, when the multi-criteria screen is to be displayed, it is assumed that the multi-criteria screen and the address input screen are simultaneously displayed.

In a situation where the employed configuration is such that the multi-criteria screen and the address input screen are simultaneously displayed, if the user wishes to identify a division on a search hierarchical level that is not quickly accessible in the search sequence while identifying divisions in the search sequence in accordance with the address input screen, the user can quickly identify a division on a desired search hierarchical level in accordance with the multi-criteria screen.

If, in step S4, a search address character string input indicative of a city is applied ("YES" in step S4), processing proceeds to step S6. If, by contrast, the search address character string input indicative of a city is not applied ("NO" in step S4), processing proceeds to step S5. The search address character string input indicative of a city may be determined to be applied when the operation detection section 223 detects the press of a button that is disposed on the touch panel on which the city screen is displayed and used to apply the input.

An example of a search address character string input indicative of a city is described below. The following describes an example in which the house number "12345" of the "ABC" street in the "YYY" city is to be input as a destination (see FIG. 7A). For the sake of convenience, FIGS. 7A to 7C show only a search address character string input field of the address input screen.

First of all, a "Y" portion displayed on the touch panel is pressed with an attempt to input a search address character string indicative of a city. This causes the second image generation section 222 to display "Y" as the first character in a city input field of the city screen.

In accordance with the display of the first character, the division identification section 224 references the "city" search hierarchical level of address data to search for all cities that begin with the alphabetical character "Y", and then searches for the second alphabetical characters of cities that begin with the alphabetical character "Y". Alphabetical character buttons marked with the retrieved second alphabetical characters are then displayed brightly while the other alphabetical character buttons are grayed out.

Subsequently, if the user selects the alphabetical character "Y" from the brightly displayed alphabetical characters, the second image generation section 222 displays the alphabetical character "Y" next to the already displayed alphabetical character "Y" in the city input field. Further, the division identification section 224 references the "city" search hierarchical level to search for all cities whose first and second alphabetical characters are "YY", and then searches for the third alphabetical characters of cities whose first and second alphabetical characters are "YY". Alphabetical character buttons marked with the retrieved third alphabetical characters are then displayed brightly while the other alphabetical character buttons are grayed out.

Finally, when the user selects "Y" from the brightly displayed alphabetical characters, the second image generation section 222 displays the alphabetical character "Y" next to the already displayed alphabetical characters "YY" in the city input field (see FIG. 7B). Further, the division identification section 224 references the "city" search hierarchical level to search for all cities whose first to third alphabetical characters are "YYY", and then searches for the fourth alphabetical characters of cities whose first to third alphabetical characters are "YYY". Alphabetical character buttons marked with the retrieved fourth alphabetical characters are then displayed brightly while the other alphabetical character buttons are grayed out.

As the input of a city is now completed, the user presses a displayed button that is used to apply the input. The operation detection section 223 then detects the press of the button so that a later-described city identification process is performed in step S6.

If, in step S5, a search hierarchical level other than the "city" search hierarchical level is selected ("YES" in step S5) in a situation where the input of a search address character string indicative of a city is not applied, processing proceeds to step S16. More specifically, if the operation detection section 223 detects the press of a displayed input item other than "city" on the multi-criteria screen, it is determined that a search hierarchical level other than "city" is selected. If, by contrast, a search hierarchical level other than the "city" search hierarchical level is not selected ("NO" in step S5), processing returns to step S4 and repeats steps S4 and beyond.

In step S6, the division identification section 224 performs a city identification process. Upon completion of step S6, processing proceeds to step S7. In the city identification process, "city" search hierarchical level data included in the address data is searched for a city that matches an applied input of a search address character string, and then the city retrieved from the search is identified as a city representative of a search target location. If a plurality of cities are retrieved from the search, for example, a city representative of a search target location may be identified, for example, by displaying a list of the retrieved cities to let the user select one of the retrieved cities.

Further, when a city representative of a search target location is identified, the first image generation section 221 displays the identified city in an input item field corresponding to the "city" search hierarchical level. If, for instance, the city is identified as "YYY", "YYY" is displayed in an input item field corresponding to the "city" search hierarchical level (see FIG. 7C).

In step S7, the second image generation section 222 performs a house number input screen display process. Upon completion of step S7, processing proceeds to step S8. In the house number input screen display process, the display device 17 displays an address input screen for inputting a house number included in an address (this screen is hereinafter referred to as the house # screen) as the earlier-described lower screen. The house # screen can be used in the same manner as the earlier-described street screen. More specifically, the user can input a search address character string and apply the input character string by pressing, with a finger or the like, a button on the address input screen displayed on the touch panel.

If, in step S8, a search address character string input indicative of a house number is applied ("YES" in step S8), processing proceeds to step S10. If, by contrast, a search address character string input indicative of a house number is not applied ("NO" in step S8), processing proceeds to step S9. A search address character string indicative of a house number is input and applied in the same manner as the aforementioned search address character string indicative of a city.

If, in step S9, a search hierarchical level other than the "house number" search hierarchical level is selected ("YES" in step S9) in a situation where the input of a search address character string indicative of a house number is not applied, processing proceeds to step S16. More specifically, if the operation detection section 223 detects the press of a displayed input item other than "house number" on the multi-criteria screen, it is determined that a search hierarchical level other than "house number" is selected. If, by contrast, a search hierarchical level other than the "house number" search hierarchical level is not selected ("NO" in step S9), processing returns to step S8 and repeats steps S8 and beyond.

In step S10, the division identification section 224 performs a house number identification process. Upon completion of step S10, processing proceeds to step S11. In the house number identification process, "house number" search hierarchical level data included in the address data is searched for a house number that matches an applied input of a search address character string, and then the house number retrieved from the search is identified as a house number representative of a search target location. If a plurality of house numbers are retrieved from the search, for example, a house number representative of a search target location may be identified, for example, by displaying a list of the retrieved house numbers to let the user select one of the retrieved house numbers.

Further, when a house number representative of a search target location is identified, the first image generation section 221 displays the identified house number in an input item field corresponding to the "house number" search hierarchical level. If, for instance, the house number is identified as "12345", "12345" is displayed in an input item field corresponding to the "house number" search hierarchical level.

In step S11, the second image generation section 222 performs a street (St.) input screen display process. Upon completion of step S11, processing proceeds to step S12. In the street (St.) input screen display process, the display device 17 displays an address input screen for inputting a street included in an address (this screen is hereinafter referred to as the street screen) as the earlier-described lower screen.

If, in step S12, a search address character string input indicative of a street is applied ("YES" in step S12), processing proceeds to step S14. If, by contrast, a search address character string input indicative of a street is not applied ("NO" in step S12), processing proceeds to step S13. A search address character string indicative of a street is input and applied in the same manner as the aforementioned search address character string indicative of a city.

If, in step S13, a search hierarchical level other than the "street" search hierarchical level is selected ("YES" in step S13) in a situation where the input of a search address character string indicative of a street is not applied, processing proceeds to step S16. More specifically, if the operation detection section 223 detects the press of a displayed input item other than "street" on the multi-criteria screen, it is determined that a search hierarchical level other than "street" is selected. If, by contrast, a search hierarchical level other than the "street" search hierarchical level is not selected ("NO" in step S13), processing returns to step S12 and repeats steps S12 and beyond.

In step S14, the division identification section 224 performs a street (St.) identification process. Upon completion of step S14, processing proceeds to step S15. In the street (St.) identification process, "street" search hierarchical level data included in the address data is searched for a street that matches an applied input of a search address character string, and then the street retrieved from the search is identified as a street representative of a search target location. If a plurality of streets are retrieved from the search, for example, a street representative of a search target location may be identified, for example, by displaying a list of the retrieved streets to let the user select one of the retrieved streets.

Further, when a street representative of a search target location is identified, the first image generation section 221 displays the identified street in an input item field corresponding to the "street" search hierarchical level. If, for instance, the street is identified as "ABC", "ABC" is displayed in an input item field corresponding to the "street" search hierarchical level.

In step S15, the location search section 225 performs a location search process. Upon completion of step S15, the flowchart comes to an end. In the location search process, the address data is searched for a location containing the state, city, street, and house number identified by the division identification section 224, and then the location retrieved from the search is identified as the search target location. After the search target location is identified, the second image generation section 222 may use the lower screen to display the address of the identified search target location, and the aforementioned route search process may be performed with the identified search target location selected as a destination. Further, when the search target location is identified, the first image generation section 221 may cause the display device 17 to terminate the display of the multi-criteria screen.

Figure 5:
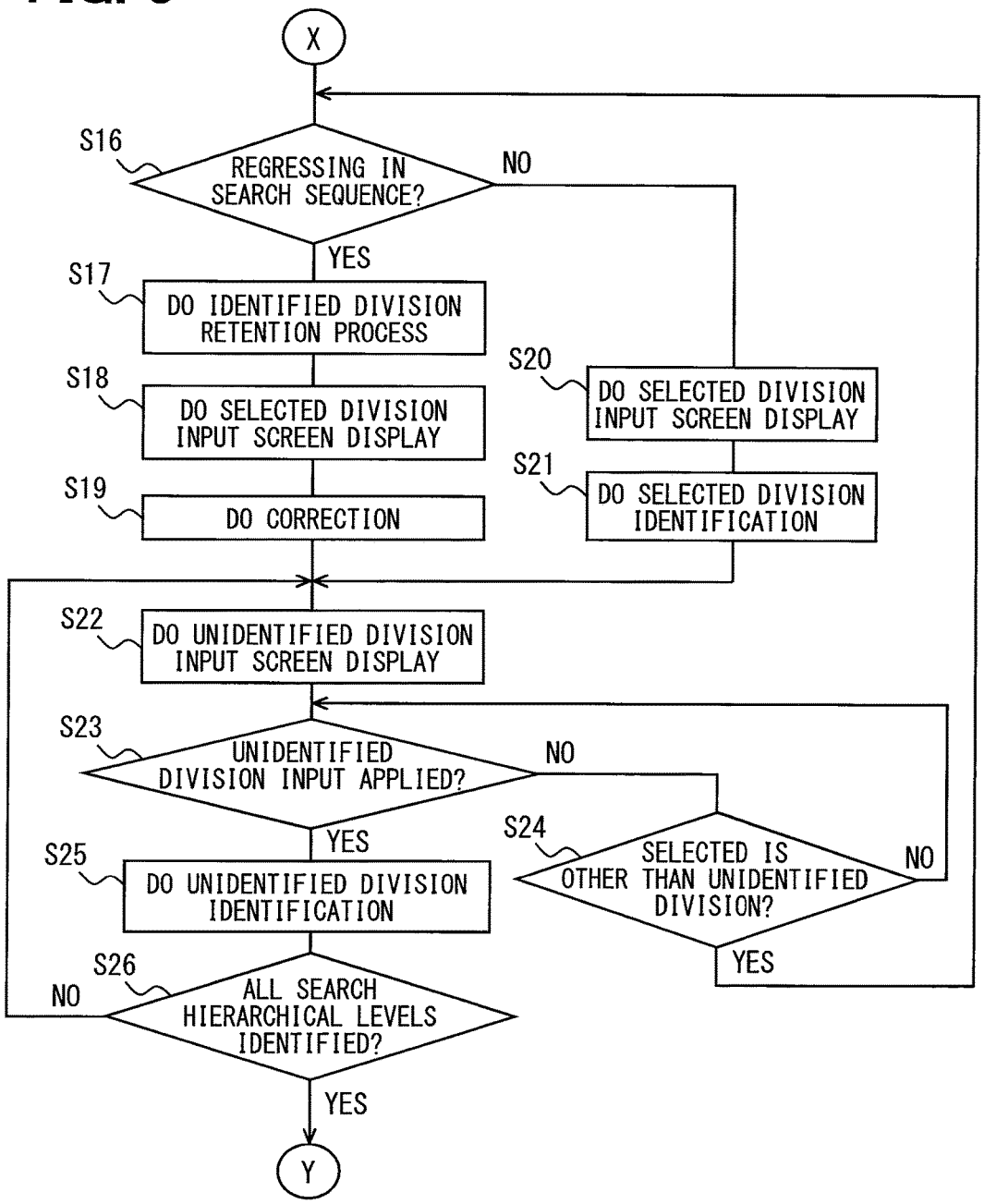
FIG. 5 is a flowchart illustrating an example of the address search process performed by the control device 22 of the navigation device 1.

Referring now to FIG. 5, in step S16, the regress determination section 226 determines whether the search hierarchical level selected in the last step (hereinafter referred to as the selected search hierarchical level) is a search hierarchical level that is reached by moving backward in the aforementioned search sequence. For example, if a search hierarchical level on which a division is identified by the division identification section 224 is selected, the regress determination section 226 may determine that the selected search hierarchical level is a search hierarchical level that is reached by moving backward in the aforementioned search sequence. If, by contrast, the selected search hierarchical level is other than a search hierarchical level on which a division is identified by the division identification section 224, the regress determination section 226 may determine that the selected search hierarchical level is a search hierarchical level that is reached without moving backward in the aforementioned search sequence.

More specifically, if, for example, the user selects "city" by pressing an displayed input item for the "city" search hierarchical level on the multi-criteria screen in a situation where the state, city, and house number are identified but the street remains to be identified (see FIG. 8A), the regress determination section 226 determines that the selected search hierarchical level is a search hierarchical level that is reached by moving backward in the aforementioned search sequence.

If it is determined that the selected search hierarchical level is to be reached by moving backward in the aforementioned search sequence (that is, a regress is attempted) ("YES" in step S16), processing proceeds to step S17. If, by contrast, it is determined that the selected search hierarchical level is to be reached without moving backward in the aforementioned search sequence ("NO" in step S16), processing proceeds to step S20.

In step S17, the identified division retention section 227 performs an identified division retention process. Upon completion of step S17, processing proceeds to step S18. In the identified division retention process, a division that is identified by the division identification section 224 but is not identified on the same search hierarchical level as the aforementioned selected search hierarchical level (this division is hereinafter referred to as an identified division to be not corrected) is stored in the RAM or other memory. Further, in the identified division retention process, the first image generation section 221 continues to display an identified division to be not corrected that is displayed as an identified division in an input item field corresponding to a search hierarchical level on the multi-criteria screen.

More specifically, if, for example, the state, city, and house number are identified and the "city" hierarchical level is selected, the first image generation section 221 continues to display the state and house number, which are the identified divisions to be not corrected (see FIG. 8B).

In step S18, the second image generation section 222 performs a selected division input screen display process, and processing proceeds to step S19. In the selected division input screen display process, the display device 17 displays an address input screen for inputting a division on the selected search hierarchical level as the earlier-described lower screen.

If, for example, the "city" search hierarchical level is selected, the earlier-described city screen is displayed. If the "house number" search hierarchical level is selected, the earlier-described house # screen (house number screen) is displayed. If the "state" search hierarchical level is selected, the display device 17 displays an address input screen for inputting the state as a part of an address (this screen is hereinafter referred to as the state screen) as the earlier-described lower screen. The state screen can be used in the same manner as the earlier-described street screen. More specifically, the user can input a search address character string and apply the input character string by pressing, with a finger or the like, a button on the address input screen displayed on the touch panel.

In step S19, the correction section 228 performs a correction process in which the division identification section 224 re-identifies a division. Upon completion of step S19, processing proceeds to step S22. In the correction process, when a search address character string input indicative of a division on a selected search hierarchical level is applied, the correction section 228 causes the division identification section 224 to search address data on the selected search hierarchical level for a division that matches the applied search address character string input, and to re-identify the division retrieved from the search as a division representative of the search target location.

When a city is to be identified, the same process as the earlier-described city identification process can be performed. When a house number is to be identified, the same process as the earlier-described house number identification process can be performed. When a state is to be identified in a situation where a search address character string input indicative of a state is applied, address data on the "state" search hierarchical level is searched for a state that matches the applied search address character string input, and the state retrieved from the search is identified as a state representative of the search target location.

If, for example, the "city" search hierarchical level is selected in a situation where a search address character string input indicative of the city to be re-identified is applied, a city that matches the applied search address character string input is searched for again, and the city retrieved from the search is re-identified as a city representative of the search target location (see FIG. 8C). When the city is re-identified, the first image generation section 221 displays the re-identified city in an input item field corresponding to the "city" search hierarchical level. If, for instance, the city is re-identified as "ZZZ", "ZZZ" is displayed in an input item field corresponding to the "city" search hierarchical level (see FIG. 8D).

Further, in the correction process, if a non-existent combination of identified divisions on different search hierarchical levels, which does not exist as any addresses in the address data, is obtained as a result of the division re-identification, the identified division on the search hierarchical level that is inconsistent with the re-identified division on the search hierarchical level may be erased from the memory. Further, in addition to the erasure of the identified division on the search hierarchical level that is inconsistent with the re-identified division on the search hierarchical level, the first image generation section 221 may clear the display of the identified division erased from the memory from the multi-criteria screen as well.

As described above, if the inconsistency occurs due to the correction, the associated display is automatically erased or adjusted to provide a user-friendly display.

If the result of determination in step S16 indicates that a regress is not attempted, step S20 is performed in the same manner as step S18 so that the second image generation section 222 performs the selected division input screen display process. Upon completion of step S20, processing proceeds to step S21.

In step S21, the division identification section 224 performs a selected division identification process. Upon completion of step S21, processing proceeds to step S22. When a search address character string input indicative of a division on the selected search hierarchical level is applied, the selected division identification process is performed to search the address data on the selected search hierarchical level for a division that matches the applied search address character string input, and to identify the division retrieved from the search as a division representative of the search target location. Further, when the division representative of the search target location is identified, the first image generation section 221 displays the identified division in an input item field for a search hierarchical level on the multi-criteria screen. The process for division identification can be performed in the same manner as the earlier-described city identification process, house number identification process, street identification process, and state identification process.

In step S22, the second image generation section 222 performs an unidentified division input screen display process. Upon completion of step S22, processing proceeds to step S23. In the unidentified division input screen display process, the display device 17 displays, as the aforementioned lower screen, an address input screen for inputting a division on a search hierarchical level for an unidentified division closest to the beginning of a search sequence of the search hierarchical levels (hereinafter referred to as an input target unidentified division). The unidentified division is a search hierarchical level division that is not identified by the division identification section 224 or re-identified by the correction section 228. When the search sequence of the search hierarchical levels is in the order of "state", "city", "house number", "street", the beginning of the search sequence is "state".

If, in step S23, a search address character string input indicative of an input target unidentified division is applied ("YES" in step S23), processing proceeds to step S25. If, by contrast, a search address character string input indicative of the input target unidentified division is not applied ("NO" in step S23), processing proceeds to step S24. A search address character string indicative of an input target unidentified division is input and applied in the same manner as the aforementioned search address character string.

If, in step S24, a search hierarchical level other than a search hierarchical level corresponding to an input target unidentified division is selected ("YES" in step S24) in a situation where the input of a search address character string indicative of the input target unidentified division is not applied, processing proceeds to step S16. If, by contrast, a search hierarchical level other than the search hierarchical level corresponding to the input target unidentified division is not selected ("NO" in step S24), processing returns to step S23 and repeats steps S23 and beyond.

In step S25, the division identification section 224 performs an unidentified division identification process. Upon completion of step S25, processing proceeds to step S26. In the unidentified division identification process, address data on a search hierarchical level corresponding to the input target unidentified division is searched for a division that matches the applied search address character string input, and the division retrieved from the search is identified as a division representative of the search target location. Further, when the division representative of the search target location is identified, the first image generation section 221 displays the identified division in an input item field for a search hierarchical level on the multi-criteria screen. The process for division identification can be performed in the same manner as the earlier-described city identification process, house number identification process, street identification process, and state identification process.

If, in step S26, the division on every search hierarchical level is identified ("YES" in step S26), processing proceeds to step S15. If, by contrast, one or more divisions remain unidentified ("NO" in step S26), processing returns to step S22 and the unidentified divisions are sequentially identified in the search sequence of the search hierarchical levels.

Figure 9:
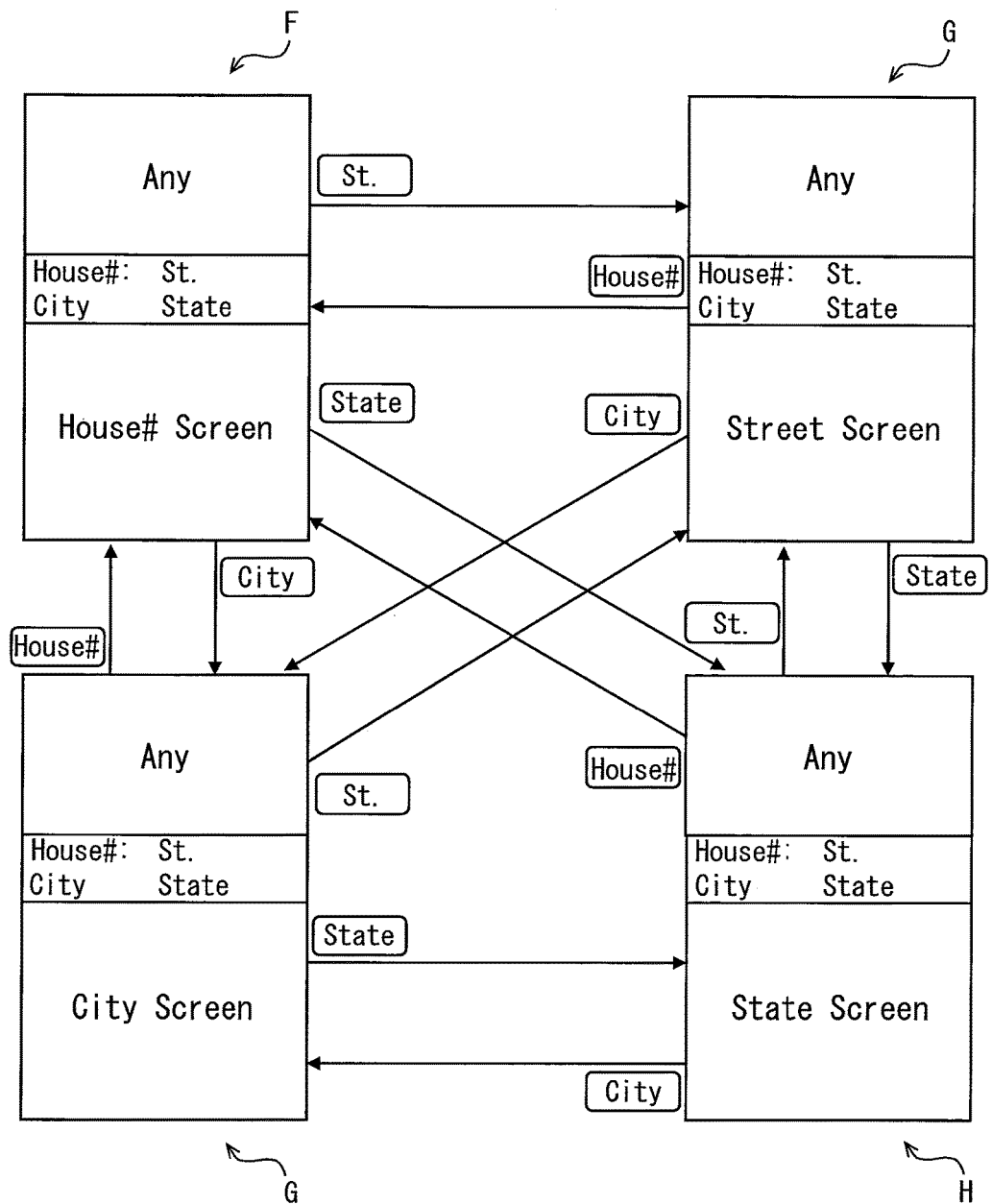
FIG. 9 is a schematic diagram illustrating the advantageous effects of a first embodiment of the present disclosure.

When the user selects an input item on the multi-criteria screen, the configuration of the first embodiment permits the user to freely identify a division on a desired search hierarchical level as shown in FIG. 9. In FIG. 9, F shows a state where the multi-criteria screen is displayed as the upper screen while the house # screen (house number screen) is displayed as the lower screen. G shows a state where the multi-criteria screen is displayed as the upper screen while the street screen is displayed as the lower screen. G in FIG. 9 shows a state where the multi-criteria screen is displayed as the upper screen while the city screen is displayed as the lower screen. H shows a state where the multi-criteria screen is displayed as the upper screen while the state screen is displayed as the lower screen.

When the user selects, from input items on the multi-criteria screen, a search hierarchical level by moving backward in the search sequence of the search hierarchical levels, the configuration of the first embodiment permits the user to re-identify a division on the selected search hierarchical level. This eliminates the necessity of re-identifying all divisions from the beginning of the search sequence. As a result, a search for a location can be facilitated when the user regresses to an intermediate search hierarchical level and repeats a division identification procedure in a situation where the search is to be narrowed in the predefined search sequence of search hierarchical levels in order to find the location.

Further, even when the user re-identifies a division on a search hierarchical level that is reached by moving backward in the search sequence of the search hierarchical levels, the configuration of the first embodiment retains identified divisions other than the re-identified division. Thus, the retained identified divisions need not be re-identified as far as they are consistent with the re-identified division. Consequently, even when a division on a search hierarchical level is to be re-identified by moving backward in the search sequence, the number of divisions to be re-identified can be reduced to further facilitate the search for a location.

Moreover, the configuration of the first embodiment displays the name of an identified division in an input item field on the multi-criteria screen. More specifically, a character string indicative of the division identified by the division identification section 224 is displayed on the multi-criteria screen in association with a character string indicative of a search hierarchical level used to identify the division. This makes it easy for the user to recognize the association between an identified division and a search hierarchical level and select a search hierarchical level for re-identification from input items on the multi-criteria screen.

Second Embodiment

The present disclosure is not limited to the first embodiment, which has been described earlier. The first embodiment is applicable to a case where an address search is performed to search for a location indicated by an address. The present disclosure may also be configured so as to perform an intersection search to search for a location at which two streets intersect (that is, an intersection) (this configuration is hereinafter referred to as a second embodiment of the present disclosure). For convenience of explanation, members having the same function as the members depicted in the figures used to describe the first embodiment will be designated by the same reference numerals as their counterparts and will not be redundantly described.

When an intersection is to be searched for, a "cross streets" search hierarchical level may be used as the address data in place of the "house number" and "street" search hierarchical levels. A combination of two streets (intersecting roads) may be stored on the "cross streets" search hierarchical level.

Instead of performing the house number (#) input screen display process and the street (St.) input screen display process, the second image generation section 222 causes the display device 17 to display, as the lower screen, an address input screen (that is, a cross streets screen), which is used to input two streets. Further, the division identification section 224 performs a cross streets identification process instead of the house number (#) identification process and the street (St.) identification process. Further, in the multi-criteria screen display process, the first image generation section 221 may display "state", "city", and "cross streets" input items.

In the cross streets identification process, the address data on the "cross streets" search hierarchical level is searched for intersecting roads that match an applied input of two street character strings, and the intersecting roads retrieved from the search are identified as intersecting roads representative of a search target intersection. Further, when divisions on the "state" and "city" search hierarchical levels are also identified, as is the case with the first embodiment, in addition to the intersecting roads, the address data is searched for a location that matches all of the identified state, city, and intersecting roads, and the location retrieved from the search is identified as the search target intersection.

When the user selects a search hierarchical level from input items on the multi-criteria screen by moving backward in the search sequence of the search hierarchical levels, the configuration of the second embodiment also permits the user to re-identify a division on the selected search hierarchical level. This eliminates the necessity of re-identifying all divisions from the beginning of the search sequence. As a result, a search for an intersection can be facilitated when the user narrows the search in the predefined search sequence of the search hierarchical levels with an attempt to find the intersection but regresses to an intermediate search hierarchical level of the search sequence to re-identify a division In the first and second embodiments, which have been described above, an input item may be selected from the multi-criteria screen by manipulating the touch panel or by manipulating the mechanical switches such as the operating switches 19 or the remote control 20. When, for instance, the mechanical switches are used, a cursor may be moved on the multi-criteria screen by manipulating the mechanical switches. When the activation of an apply button, which is one of the operating switches 19, is detected by the operation detection section 223, it may be determined that an input item pointed to by the cursor at the time of activation detection is selected. Thus, the remote control 20 also corresponds to the search hierarchical level designation input section.

In the first and second embodiments, which have been described above, the address input screen may display touch panel buttons for switching to a particular search hierarchical level, such as a preceding or succeeding search hierarchical level in the search sequence. This makes it possible to identify a division on a particular search hierarchical level irrespective of the search sequence without selecting an input item on the multi-criteria screen.

Embodiment of the present disclosure are not limited to respective embodiments illustrated above. The above-illustrated embodiments can be modified in various ways. For example, embodiments obtained by appropriately combining technical elements disclosed in different embodiments also fall within embodiments of the present disclosure.

The invention claimed is:

1. A geographical location search device comprising:
at least one processor and a memory storing instructions that, when executed by the at least one processor, cause the geographical location search device to:
divide, by a character string information storage section, character string information indicative of a geographical location into three or more search hierarchical levels according to units of geographical division of the search hierarchical levels, and store the divided character string information;
accept, by a character string input section, a character string input from a user for making a search for the geographical location;
reference, by a division identification section, in an predefined search sequence of the search hierarchical levels, the character string information of the search hierarchical level stored by the character string information storage section to sequentially identify, for each search hierarchical level, the geographical division indicated by the character string information containing the character string input accepted by the character string input section; and search, by a geographical location search section, for the geographical location through causing the division identification section to sequentially identify the geographical divisions, the processor further executing instructions to:

accept, by a search hierarchical level designation input section, a user input designating a search hierarchical level;

when the search hierarchical level designation input section accepts the input designating a search hierarchical level that is reached by moving backward the predefined search sequence of the search hierarchical levels, regress, by a correction section, to the designated search hierarchical level and cause the division identification section to re-identify a geographical division; and display, by a multi-criteria screen display control section, a multi-criteria screen via which the user inputs and selects a desired search hierarchical level from all the search hierarchical levels with the search hierarchical level designation input section, the processor further executing instructions to:

when the correction section regresses to the designated search hierarchical level to cause the division identification section to re-identify the geographical division, retain, by an identified division retention section, the geographical division already identified by the division identification section except the geographical division to be re-identified by the correction section, wherein when a non-existent combination of the identified geographical division retained by the identified division retention section and the geographical division re-identified by the division identification section is obtained in a situation where the correction section regressed to the designated search hierarchical level and the division identification section re-identified the geographical division, (i) automatically invalidate, by the correction section, the identified geographical division that is inconsistent with the geographical division re-identified by the division identification section and (ii) clear, by the correction section, from the multi-criteria screen display, the identified geographical division that is inconsistent with the geographical division re-identified by the division identification section.

2. The geographical location search device according to claim 1, wherein the at least one processor is further configured to when a geographical division is left unidentified except for the corrected geographical division re-identified by the correction section and the geographical division retained by the identified division retention section in a situation where the correction section regressed to the designated search hierarchical level and the division identification section re-identified the geographical division, identify, by the division identification section, the unidentified geographical division in the search sequence from the search hierarchical level that is left as having the unidentified geographical division and is closest to the beginning of the search sequence.

3. The geographical location search device according to claim 1, wherein the at least one processor is further configured to:

when no geographical divisions are left unidentified by the division identification section except for the corrected geographical division re-identified by the correction section and the geographical divisions retained by the identified division retention section in a situation where the correction section regressed to the designated search hierarchical level and the division identification section re-identified the geographical division, search by the geographical location search section, for the geographical location by narrowing down using the corrected geographical division and the retained geographical divisions.

4. The geographical location search device according to claim 1, wherein the at least one processor is further configured to display, by a character string input screen display control section, each time when the search hierarchical level for the division identification section to identify the geographical division is changed, a character string input screen in accordance with the newly changed search hierarchical level to show the character string input accepted by the character string input section, wherein the character string input screen and the multi-criteria screen are simultaneously displayed.

5. The geographical location search device according to claim 1, wherein the at least one processor is further configured to display, on the multi-criteria screen, by the multi-criteria screen display control section, not only (i) character strings indicative of all of the search hierarchical levels but also (ii) a character string indicative of a geographical division identified by the division identification section in association with a character string indicative of a search hierarchical level used to identify the geographical division.

6. The geographical location search device according to claim 1, wherein the at least one processor is further configured to when displaying a warning screen related to warning, preferentially display, by the multi-criteria screen display control section, the warning screen by displaying the warning screen over the multi-criteria screen or in place of the multi-criteria screen.

7. The geographical location search device according to claim 1, wherein:

the search hierarchical levels stored in the character string information storage section include at least a first search hierarchical level, a second search hierarchical level, and a third search hierarchical level;

in the first search hierarchical level, geographical locations managed in units of first geographical division are associated with respective character string information identifying the geographical locations;

in the second search hierarchical level, geographical locations managed in units of second geographical division are associated with respective character string information identifying the geographical location, the second geographical division being smaller than the first geographical division;

in the third search hierarchical level, geographical locations managed in units of third geographical division are associated with respective character string information identifying the geographical locations, the third geographical division being smaller than the second geographical division;

wherein the at least one processor is further configured to
when none of the search hierarchical levels are designated by the search hierarchical level designation input section, search, by the division identification section, for a search target geographical location in an order of the first search hierarchical level, the second search hierarchical level and the third search hierarchical level by sequentially narrowing a geographical division to which the search target geographical location belongs from a large geographical division to a small geographical division in such manners that:
in accordance with input of first character string information to the character string input section with an attempt to search for the search target geographical location, identify, by the division identification section, a geographical division on the first search hierarchical level to which the search target geographical location belongs;
in accordance with input of second character string information to the character string input section with an attempt to search for the search target geographical location, search, by the division identification section, for a geographical division on the second search hierarchical level to which the search target geographical location belongs; and
in accordance with input of third character string information input to the character string input section with an attempt to search for the search target geographical location, identify, by the division identification section, a geographical division on the third search hierarchical level to which the search target geographical location belongs; and
when the search hierarchical level designation input section accepts an input designating the first search hierarchical level in a situation where the geographical division on the third search hierarchical level to which the search target geographical location belongs is unidentified by the division identification section but the geographical division on the first search hierarchical level and the geographical division on the second search hierarchical level to which the search target geographical location belongs are identified by the division identification section, re-identify, by the correction section, the geographical division on the first search hierarchical level to which the search target geographical location belongs while retaining the geographical division on the second search hierarchical level to which the search target geographical location belongs, and then identify the geographical division on the third search hierarchical level to which the search target geographical location belongs.

8. The geographical location search device according to claim 1, wherein:
the at least one processor is further configured to search for a geographical address on map indicative of the geographical location, through causing the division identification section to sequentially identify the geographical divisions which are respectively indicative of state, city, street and house number.

9. The geographical location search device according to claim 1, wherein:
the at least one processor is further configured to search for an intersection, at which roads are intersecting, as the geographical location, through causing the division identification section to sequentially identify the geographical divisions which are respectively indicative of state, city, street and cross streets.

10. A geographical location search device comprising:
at least one processor and a memory storing instructions that, when executed by the at least one processor, cause the geographical location search device to:
divide, by a character string information storage section, character string information indicative of a geographical location into three or more search hierarchical levels according to units of geographical division of the search hierarchical levels, and store the divided character string information;
accept, by a character string input section, a character string input from a user for making a search for the geographical location;
reference, by a division identification section, in an predefined search sequence of the search hierarchical levels, the character string information of the search hierarchical level stored by the character string information storage section to sequentially identify, for each search hierarchical level, the geographical division indicated by the character string information containing the character string input accepted by the character string input section; and
search, by a geographical location search section, for the geographical location through causing the division identification section to sequentially identify the geographical divisions,
the at least one processor further executing instructions to:
accept, by a search hierarchical level designation input section, a user input designating a search hierarchical level; and
when the search hierarchical level designation input section accepts the input designating a search hierarchical level that is reached by moving backward the predefined search sequence of the search hierarchical levels,
regress, by a correction section, to the designated search hierarchical level and cause the division identification section to re-identify a geographical division,
the at least one processor further executing instructions to:
display, by a multi-criteria screen display control section, a multi-criteria screen via which the user inputs and selects a desired search hierarchical level from all the search hierarchical levels with the search hierarchical level designation input section; and
display, by a character string input screen display control section, each time when the search hierarchical level for the division identification section to identify the geographical division is changed, a character string input screen in accordance with the newly changed search hierarchical level to show the character string input accepted by the character string input section,
wherein the character string input screen and the multi-criteria screen are simultaneously displayed,
the at least one processor further executing instructions to:
when the correction section regresses to the designated search hierarchical level to cause the division identification section to re-identify the geographical division,
retain, by an identified division retention section, the geographical division already identified by the division identification section except the geographical division to be re-identified by the correction section,
wherein
when a non-existent combination of the identified geographical division retained by the identified division retention section and the geographical division re-identified by the division identification section is obtained in a situation where the correction section regressed to the designated search hierarchical level and the division identification section re-identified the geographical division, (i) invalidate, by the correction section, the identified geographical division that is inconsistent with the geographical division re-identified by the division identification section and (ii) clear, by the correction section, from the multi-criteria screen display, the identified geographical division that is inconsistent with the geographical division re-identified by the division identification section.

11. The geographical location search device according to claim 10, wherein:
the at least one processor is further configured to search for a geographical address on map indicative of the geographical location, through causing the division identification section to sequentially identify the geographical divisions which are respectively indicative of state, city, street and house number.

12. The geographical location search device according to claim 10, wherein:
the processor at least one is further configured to search for a geographical address on map indicative of the geographical location, through causing the division identification section to sequentially identify the geographical divisions which are respectively indicative of state, city, and cross streets.

* * * * *